US010049194B2

(12) United States Patent
Hasegawa et al.

(10) Patent No.: US 10,049,194 B2
(45) Date of Patent: Aug. 14, 2018

(54) CONTROL ACCESS TO FUNCTION OF INFORMATION DEVICE

(71) Applicant: International Business Machines Corporation, Armonk, NY (US)

(72) Inventors: Tohru Hasegawa, Tokyo (JP); Yutaka Oishi, Kawasaki (JP); Masao Takayama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 14/953,244

(22) Filed: Nov. 27, 2015

(65) Prior Publication Data

US 2017/0154172 A1 Jun. 1, 2017

(51) Int. Cl.
*G06F 21/30* (2013.01)
*G06F 21/45* (2013.01)
*G06F 21/34* (2013.01)

(52) U.S. Cl.
CPC .......... *G06F 21/305* (2013.01); *G06F 21/34* (2013.01); *G06F 21/45* (2013.01)

(58) Field of Classification Search
CPC ......... G06F 21/305; G06F 21/34; G06F 21/45
See application file for complete search history.

(56) References Cited

U.S. PATENT DOCUMENTS

| 7,373,657 | B2 * | 5/2008 | Walker | G06F 21/35 380/270 |
| 9,552,684 | B2 * | 1/2017 | Bacco | G07C 9/00158 |
| 9,666,000 | B1 * | 5/2017 | Schoenfelder | G07C 9/00111 |
| 9,681,301 | B2 * | 6/2017 | Mazzarella | H04W 12/08 |
| 9,704,317 | B2 * | 7/2017 | Baumgarte | G07C 9/00309 |
| 9,710,987 | B2 * | 7/2017 | Scoggins | G07C 9/00904 |
| 9,727,937 | B2 * | 8/2017 | Jin | G06Q 50/22 |
| 9,754,432 | B2 * | 9/2017 | Bender | G07C 9/00309 |
| 9,763,097 | B2 * | 9/2017 | Robinson | H04W 12/08 |
| 2007/0164847 | A1 * | 7/2007 | Crawford | G06F 21/35 340/5.61 |
| 2007/0241187 | A1 * | 10/2007 | Alderucci | G06F 21/10 235/382 |
| 2009/0065578 | A1 | 3/2009 | Peterson | |
| 2009/0216587 | A1 | 8/2009 | Dwivedi | |
| 2009/0237203 | A1 | 9/2009 | Determan | |
| 2011/0307724 | A1 * | 12/2011 | Shaw | G06F 21/305 713/323 |

(Continued)

*Primary Examiner* — Beemnet Dada
*Assistant Examiner* — Stephen Gundry
(74) *Attorney, Agent, or Firm* — Anthony V. S. England (57) ABSTRACT

A control system for controlling access to a protected function of an information device is disclosed. The control system includes a communication device configured to communicate with the information device entering an area. The control system also includes a database configured to store a relationship between the information device and a registered user. The control system further includes a control computer communicably coupled to the communication device. The control computer is configured to identify a user entering the area with the information device. The control computer is also configured to determine whether or not to permit access to the protected function based on the identified user and the registered user for the information device. The control computer is further configured to control the information device via the communication device so as to unlock or lock the protected function based on a result of determination whether or not to permit access.

15 Claims, 7 Drawing Sheets

(56) References Cited

U.S. PATENT DOCUMENTS

| | | | | |
|---|---|---|---|---|
| 2012/0025947 A1* | 2/2012 | Sinha | ............... | G07C 9/00111 340/5.6 |
| 2012/0042366 A1* | 2/2012 | Jin | ............... | G06Q 50/24 726/7 |
| 2013/0282589 A1* | 10/2013 | Shoup | ............... | G06F 21/34 705/67 |
| 2014/0240088 A1 | 8/2014 | Robinette | | |
| 2015/0221151 A1* | 8/2015 | Bacco | ............... | G07C 9/00158 340/5.83 |
| 2016/0300413 A1* | 10/2016 | Robertson | ............... | G07C 9/00571 |
| 2016/0337346 A1* | 11/2016 | Momchilov | ............... | G06F 21/34 |
| 2016/0337863 A1* | 11/2016 | Robinson | ............... | H04W 12/08 |
| 2016/0350991 A1* | 12/2016 | Baumgarte | ............... | G07C 9/00309 |
| 2016/0353239 A1* | 12/2016 | Kjellsson | ............... | H04W 4/021 |
| 2016/0371904 A1* | 12/2016 | Sinha | ............... | G07C 9/00111 |
| 2017/0017787 A1* | 1/2017 | Lane | ............... | G06F 21/35 |
| 2017/0017810 A1* | 1/2017 | Bolotin | ............... | G06F 21/78 |
| 2017/0053467 A1* | 2/2017 | Meganck | ............... | G07C 9/00039 |
| 2017/0094524 A1* | 3/2017 | Mazzarella | ............... | H04W 4/90 |
| 2017/0109518 A1* | 4/2017 | Matsuura | ............... | G06F 21/44 |
| 2017/0109950 A1* | 4/2017 | Bacco | ............... | G07C 9/00087 |
| 2017/0126648 A1* | 5/2017 | Bond | ............... | G06F 9/542 |
| 2017/0140589 A1* | 5/2017 | Bender | ............... | G07C 9/00309 |
| 2017/0154483 A1* | 6/2017 | Cordiner | ............... | G07C 9/00571 |
| 2017/0213405 A1* | 7/2017 | Prasad | ............... | G07C 9/00571 |
| 2017/0221290 A1* | 8/2017 | Allibhoy | ............... | G07C 9/00087 |
| 2017/0228953 A1* | 8/2017 | Lupovici | ............... | G07C 9/00309 |
| 2017/0234036 A1* | 8/2017 | Ebner | ............... | E05B 39/04 70/51 |
| 2017/0236352 A1* | 8/2017 | Conrad | ............... | G07C 9/00309 340/5.61 |
| 2017/0243425 A1* | 8/2017 | Meganck | ............... | G07C 9/00309 |

* cited by examiner

CONTROL ACCESS TO FUNCTION OF INFORMATION DEVICE

BACKGROUND

The present invention, generally, relates to access control technique in the field of information security, more particularly, to control access to a function of an information device.

Data that contains information on individuals and/or confidential information is often stored in portable devices such as USB (Universal Serial Bus) flash memories, SD™ card, or the like.

SUMMARY

According to an embodiment of the present invention, there is provided a control system for controlling access to a protected function of an information device. The control system comprises a communication device, a database and a control computer communicably connected to the communication device. The communication device is configured to communicate with the information device entering an area. The database is configured to store a relationship between the information device and a registered user. The control computer is configured to identify a user entering the area with the information device. The control computer is also configured to determine whether or not to permit access to the protected function based on the identified user and the registered user for the information device. The control computer is further configured to control the information device via the communication device so as to unlock or lock the protected function based on a result of determination whether or not to permit access.

According to other embodiment of the present invention, there is provided a method for controlling access to a protected function of an information device by a control computer. The control computer identifies a user entering an area with the information device. The control computer also receives an identifier from the information device entering the area by a communication device that is communicably connected to the control computer. The control computer further determines whether or not to permit access to the protected function based on the identified user and a registered user in relation to the identifier. Further the control computer transmits a control signal to the information device by the communication device so as to unlock or lock the protected function based on a result of determination whether or not to permit access.

Control computers and computer program products relating to one or more aspects of the present invention are also described and claimed herein.

According to further other embodiment of the present invention, there is provided an information device. The information device comprises a communication device configured to communicate with a control computer in entering an area. The information device also comprises a protected module, to which access is controlled by the control computer. The information device further comprises a control module configured to block access to the protected module if the protected module is locked. The information device further comprises an interface for accessing the protected module via the control module. The control module is further configured to send an identifier used to identify the information device to the control computer by the communication device. The control module is also configured to receive a control signal from the control computer by the communication device. The control module is further configured to unlock or lock the protected module in response to receiving the control signal.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to control systems, methods, control computers and computer program products for controlling access to a protected function of an information device, as well as the information devices.

Sensitive information, such as information requiring management of secrets may suffer from a risk of leakage if a portable device holding the sensitive information is handed to an unauthorized party. Data encryptions and access restrictions, typically, can be used to protect the sensitive information stored in the information device. However, once the information device is handed to the unauthorized party, there is a chance that the unauthorized party attempts to break a password or a key since there is a procedure by which an authorized owner user can access to the protected data regardless of place. The unauthorized party may analyze the stored data read from the information device by using any known tools on general purpose computers such as personal computers. Thus, it is difficult to eliminate the risk of the leakage of the information via the information devices.

Herein disclosed is technology capable of reducing a risk of leakage of information via information devices, including an information device capable of reducing a risk of leakage of information.

In one or more embodiments according to the present invention, there is provided a novel access control system and a corresponding novel access control method for controlling access to a protected function of an information device. In a particular embodiment, the protected function is a secured storage region to which access is restricted by the novel access control system.

The novel access control system includes a communication device configured to communicate with an information device entering a predetermined area. In a particular embodiment, an information device entering a safety section or exiting from the safety section by passing through the predetermined area is subjected to communication. In a particular embodiment, the communication device is a wireless communication device such as RFID (radio frequency identifier) transceiver (or reader). The novel access control system further includes a database configured to store a relationship between the information devices and registered users. The novel access control system also includes a control computer communicably connected to the communication device. The control computer may include the database or may be in communication with the database on other computer.

The control computer is configured to identify a user entering the predetermined area with the information device. In a particular embodiment, a user entering the safety section or a user exiting from the safety section by passing through the predetermined area is subjected to identification. The identification may be performed by using an identification badge assigned to each owner user who is allowed to access to the protected function of the information device. Alternatively, the identification may be performed by using other identification information such as a biometric feature presented by the owner user.

The control computer is further configured to determine whether or not to permit access to the protected function based on the identified user and the registered user for the information device. The control computer is further configured to control the information device via the communication device so as to unlock or lock the protected function based on a result of the determination.

Now, referring to the series of FIGS. 1-6, there are shown an access control system and method for controlling access to a protected function of an information device as well as the information device in the access control system according to an exemplary embodiment of the present invention.

Figure 1:
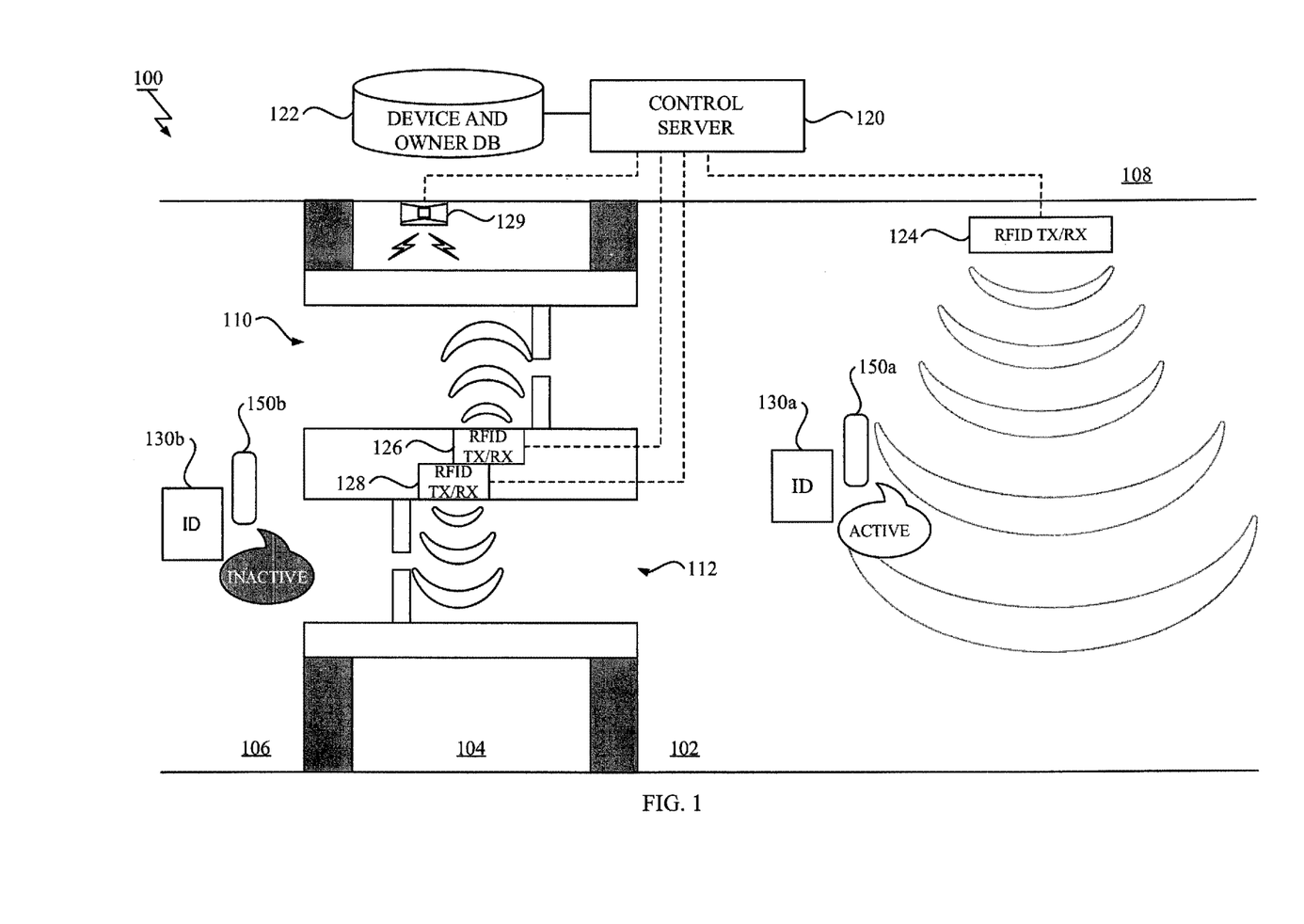
FIG. 1 shows an overview of an access control system according to an exemplary embodiment of the present invention.

Referring to FIG. 1, there is shown an overview of the access control system 100. In FIG. 1, an installed environment of the access control system 100 is depicted. In a describing embodiment, targets for access control by the access control system 100 are information devices 150, each of which has a protected function to which access is restricted. Hereinafter, the information device 150 is referred as a secured device and the protected function of the secured device 150 is referred as a device secured function.

As shown in FIG. 1, there may be mainly four sections that include a secured room 102, an entrance room 104, an outside 106 and a control room 108. The secured room 102 is a place in which selective restriction of physical access is established. Thus, a certain level of physical security is ensured in the secured room 102. The secured room 102 corresponds to a predetermined section in the describing embodiment. The control room 108 is a place where a control server 120 for controlling access to the device secured function of the secured device 150 is provided. In the describing embodiment, the control server 120 may be further configured to selectively restrict physical access of peoples to the secured room 102. The outside 106 is a place just outside the secured room 102.

The entrance room 104 is an area located between the secured room 102 and the outside 106. In the describing embodiment, a person who wants to enter the secured room 102 and a person who wants to exit from the secured room 102 are requested to enter the entrance room 104 and pass through a corresponding gate in the entrance room 104.

In the entrance room 104, there may be provided an entrance gate 110 through which a person who wants to enter the secured room 102 is requested to pass. There may be provided also an exit gate 112 through which a person who wants to exit from the secured room 102 is requested to pass. Each gate 110, 112 is equipped with a RFID transceiver (RFID TX/RX) 126, 124 as a communication device, which connects to the control server 120 in the control room 108 via an appropriate wired and/or wireless network.

The control server 120 is a control computer configured to identify a user entering the entrance room 104 together with the secured device 150. In the describing embodiment, identification of the user is performed by using an ID (identification) badge 130 assigned to an owner user of the secured device 150, who is allowed to use the secured device 150. In the describing embodiment, the secured device 150 and the ID badge 130 have a RFID transponder function that can responds to a request from the RFID transceivers 126, 124. Relationships between the secured devices 150 and the registered users such as owner users of the secured devices 150 are stored in a device and owner database (Hereinafter, the term "database" may be simply abbreviated to "DB") 122 that may be connected to the control server 120. Such relationship may be registered prior to the identification by appropriate methods.

A user entering the secured room 102 by passing through the entrance gate 110 in the entrance room 104 is subjected to the identification. Also, a user exiting from the secured room 102 by passing through the exit gate 112 in the entrance room 104 is subjected to the identification.

The RFID transceiver 126 for the entrance gate 110 is configured to communicate with the secured device 150 and the ID badge 130 entering the secured room 102 through the entrance gate 110 together. The RFID transceiver 128 for the exit gate 112 is configured to communicate with the secured device 150 and the ID badge 130 exiting from the secured room 102 through the exit gate 112 together. In the describing embodiment, communication range of the RFID transceiver 126, 128 in the gate 110, 112 may correspond to an area where the secured device 150 enters in order to communicate with the RFID transceiver 126, 128.

The control server 120 is further configured to determine whether or not to permit access to the device secured function of the secured device 150 based on the identified user and information stored in the device and owner DB 122.

The control server 120 is further configured to transmit a control signal by the RFID transceiver 126, 128 to control the secured device 150 such that the device secured function of the secured device 150 is unlocked or locked based on a result of the determination.

Generally, the secured device 150 is inactive while it resides the outside 106 of the secured room 102. However, as shown in FIG. 1, the device secured function of the secured device 150*a* that enters the secured room 102 with the ID badge 130*a* through the entrance gate 110 is controlled to be unlocked (i.e. activated) in response to determining that the access is to be permitted in entering the secured room 102. Consistency of the secured device 150 and the owner user may be automatically confirmed in response to the owner user passing the entrance room 104 with the secured device 150.

In contrast, the device secured function of the information device 150*b* that exits from the secured room 102 through the exit gate 112 is controlled to be locked (i.e. de-activated). Thus, when the owner user leaves the secured room 102, the secured device 150 may be automatically de-activated and the device secured function becomes inaccessible.

In a preferable embodiment, the access control system 100 further includes another RFID transceiver (RFID TX/RX) 124 in the secured room 102 in communication with the control server 120. The RFID transceiver 124 is a transmit device configured to transmit a confirmation signal while the secured device 150 is staying in the secured room 102, under control of the control server 120. The confirmation signal is transmitted from the RFID transceiver 124 so as to extend an effective time during which access to the device secured function of the secured device 150 is permitted.

Thus, by polling the confirmation signal more frequently than the period of the effective time, the effective time would not expire as long as the secured device 150 stays in the secured room 102. On the other hand, if the secured device 150 exists to the outside 106 from the secured room 102 without being de-activated by accident, the effective time would expire soon or later and the device secured function would become inaccessible.

In further preferable embodiment, the RFID transceiver 124 is further configured to terminate the confirmation signal for the secured device 150 related to an owner user who exits from the secured room 102, in response to detecting the exit of the owner user. Thus, if the owner user forgets to take the secured device 150 when he/she exits from the secured room 102, the effective time of the secured device 150 left behind the secured room 102 would expire soon or later.

In a preferable embodiment, the access control system 100 may further include an alarm device 129 in communication with the control server 120. The control server 120 may alarm by using the alarm device 129 based on a result of the determination. Under control of the control server 120, the alarm device 129 is configured to alarm if the secured device 150 exits from the secured room 102 by passing through the entrance room 104 even though the owner user of the secured device 150 is staying in the secured room 102 in order to notify that someone takes out the secured device 150 by mistake for example. The alarm device 129 is also configured to alarm if the owner user exits from the secured room 102 even though the secured device 150 related to the owner user is staying in the secured room 102 in order to notify misplace of the secured device 150.

The installed environment shown in FIG. 1 is only an example for appropriate environment. The entrance room 104 is clearly separated from the secured room 102 and the outside 106 in the above description. Also the entrance gate 110 and the exit gate 112 are described to be separately provided.

However, these are not intended to suggest any limitation. In other embodiment, merely an entrance or a door may be located between the secured room 102 and the outside 106 in place of the separated entrance room 104. In other embodiment, there may be provided single entrance and exit gate through which both persons who want to enter or exit from the secured room 102 are requested to pass. In other embodiment, the entrance may be merely a passage without any gate that is used to control flow of people, and the users and the secured devices 150 entering a predetermined area, which may corresponds to a communication range of the RFID transceiver 126, 128, is subjected to the identification and the communication.

Also in the describing embodiment, the ID badge is used for the identification. However, this is only an example for possible design and not intended to suggest any limitation. In other embodiment, the identification may be performed by using other identification information such as a biometric feature presented by the owner user.

Further in the describing embodiment, there is merely single secured room 102. However, in the other embodiment, there may be a plurality of predetermined safety sections where access to the device secured function of the secured device 150 is allowable. In this embodiment, a set including the RFID transceivers 124, 126, 128 is provided in each safety section among the plurality of the safety sections. The device and owner DB 122 may be further configured to store relationship between the secured device 150 and an allowable section where access to the device secured function of the corresponding secured device 150 is allowable. Access to the device secured function is denied if the secured device 150 is not in the corresponding allowable section.

Figure 2:
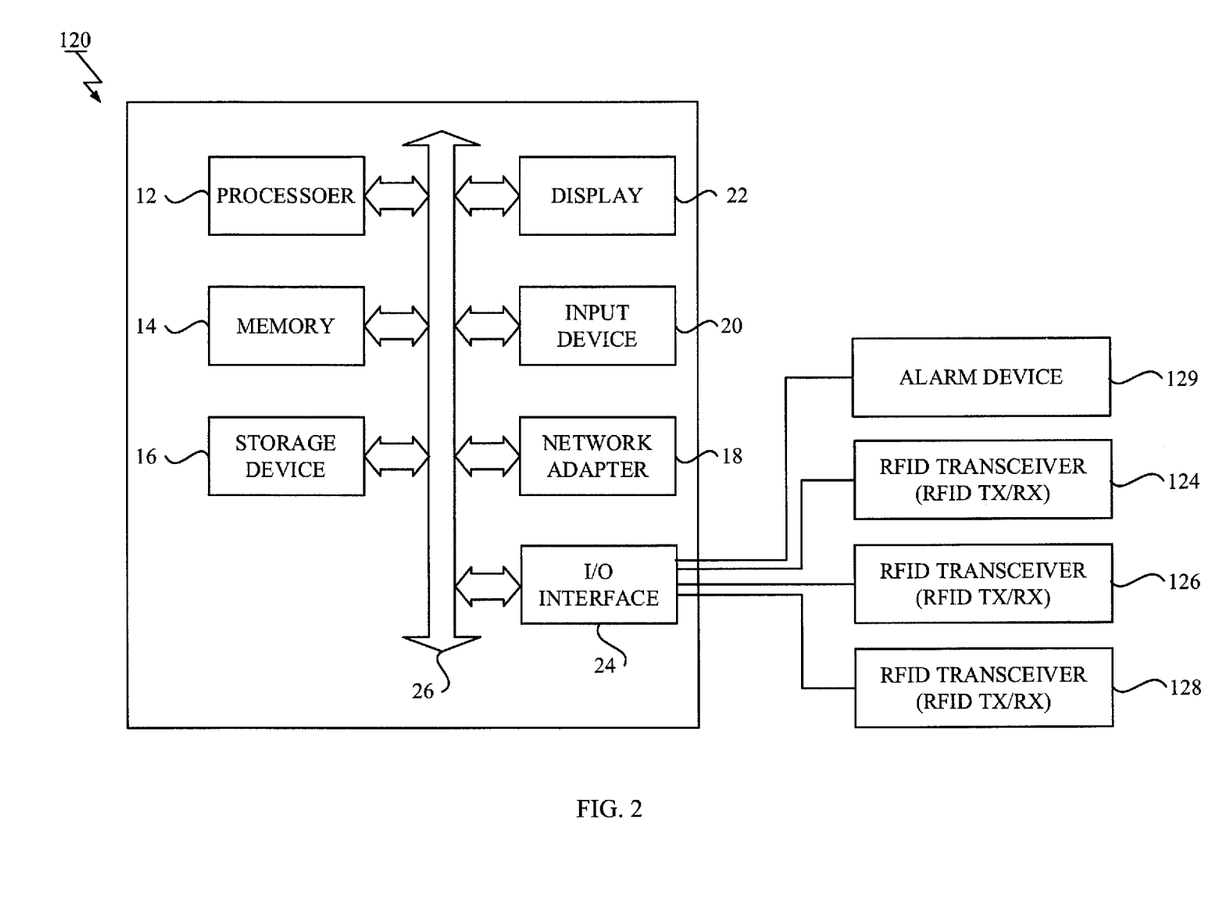
FIG. 2 depicts a schematic of a control server in the access control system according to the exemplary embodiment of the present invention.

Referring now to FIG. 2, a schematic of an example of a control server 120 is shown. The control server 120 is only one example of a suitable control computer and is not intended to suggest any limitation as to the scope of use or functionality of embodiments of the invention described herein. Regardless, the control server 120 is capable of being implemented and/or performing any of the functionality set forth herein.

The control server 120 is operational with numerous other general purpose or special purpose computing system environments or configurations. Examples of well-known computing systems, environments, and/or configurations that may be suitable for use with the control server 120 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The control server 120 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 2, the control server 120 is shown in the form of a general-purpose computing device. The components of the control server 120 may include, but are not limited to, one or more processors (or processing units) 12 and a memory 14 operatively coupled to the processors 12 by a bus 26 including a memory bus or memory controller, and a processor or local bus using any of a variety of bus architectures.

The control server 120 typically includes a variety of computer system readable media. Such media may be any available media that is accessible by the control server 120, and it includes both volatile and non-volatile media, removable and non-removable media.

The memory 14 can include computer system readable media in the form of volatile memory, such as random access memory (RAM). The control server 120 may further include other removable/non-removable, volatile/non-volatile computer system storage media. By way of example only, the storage device 16 can be provided for reading from and writing to a non-removable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus by one or more data media interfaces. As will be further depicted and described below, the storage device 16 may include at least one program product having a set (e.g., at least one) of program modules that are configured to carry out the functions of embodiments of the invention.

Program/utility, having a set (at least one) of program modules, may be stored in the storage device 16 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The control server 120 may also communicate with one or more peripherals such as a input device 20 such as keyboard, a pointing device, etc.; a display 22; one or more devices that enable a user to interact with the control server 120; and/or any devices (e.g., network card, modem, etc.) that enable the control server 120 to communicate with one or more other devices. Still yet, the control server 120 can communicate with one or more networks such as a local area network (LAN), a general wide area network (WAN), and/or a public network (e.g., the Internet) via the network adapter 18. As depicted, the network adapter 18 communicates with the other components of the control server 120 via bus 26. Also the control server 120 can communicate with RFID transceivers 124, 126, 128 and an alarm device 129 through one or more networks via the I/O interface 24. It should be understood that although not shown, other hardware and/or software components could be used in conjunction with the control server 120. Examples, include, but are not limited to: microcode, device drivers, redundant processing units, external disk drive arrays, RAID systems, tape drives, and data archival storage systems, etc.

Figure 3:
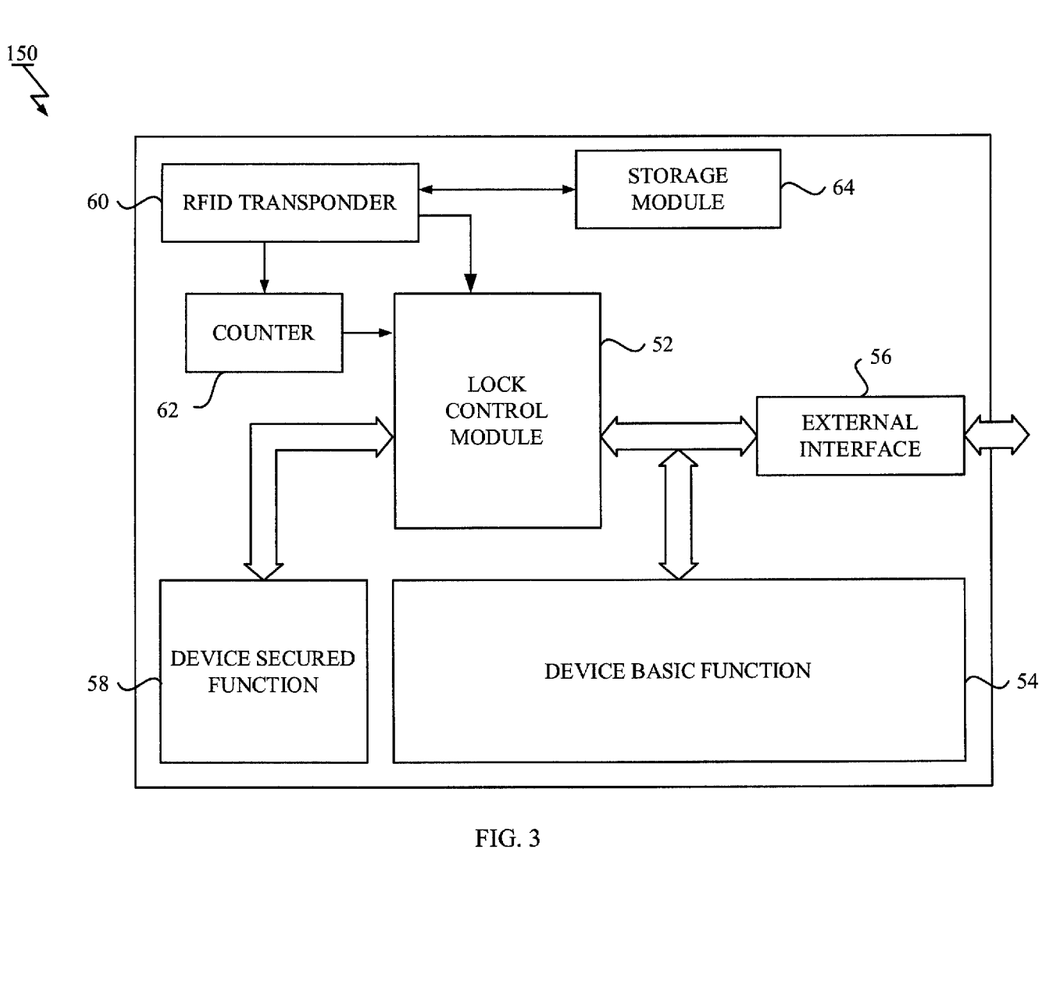
FIG. 3 depicts a schematic of a secured device in the access control system according to the exemplary embodiment of the present invention.

Referring now to FIG. 3, a schematic of an example of a secured device 150 is shown. The secured device 150 shown in FIG. 3 is only an example of a suitable information device. Regardless, the secured device 150 is capable of being implemented and/or performing any of the functionality set forth herein. In the describing embodiment, the secured device 150 may include a lock control module 52, a device basic function 54, an external interface 56, a device secured function 58, an RFID transponder 60, a counter 62 and a storage module 64.

The lock control module 52 is a control module configured to control access to the device secured function 58. The device basic function 54 is a function module for providing a certain functionality of the secured device 150, to which access is not restricted. In a particular embodiment, the device basic function 54 is a normal storage region on the secured device 150. A host computer to which the secured device 150 is connected can access the device basic function 54 without any restriction.

The external interface 56 is an interface for accessing the device basic function 54 and the device secured function 58 via the lock control module 52. The lock control module 52 is configured to block access to the device secured function 58 if the device secured function 58 is locked. The lock control module 52 is configured to pass access to the device secured function 58 if the device secured function 58 is unlocked.

In contrast to the device basic function 54, the device secured function 58 is a protected function module to which access is controlled by the control server 120. In a particular embodiment, the device secured function 58 is a secured storage region on the secured device 150. A host computer to which the secured device 150 is connected can access the device secured function 58 merely if the device secured function 58 is unlocked.

The lock and the unlock of the device secured function 58 are controlled by the lock control module 52 cooperating with the RFID transponder 60, the counter 62 and the storage module 64.

The RFID transponder 60 is a communication device configured to communicate with the control server 120 when the secured device 150 enters the gate 110, 112. The RFID transponder 60 can respond to a request from the RFID transceivers 124, 126, 128 shown in FIG. 1.

The counter 62 is configured to count down an effective time during which access to the device secured function 58 is permitted, after the information device is powered. The counter 62 may be refreshed by the lock control module 52 in response to receiving the confirmation signal transmitted from the RFID transceiver 124 in FIG. 1 by the RFID transponder 60 while the secured device 150 is staying in the secured room 102. After activation, the effective time of the secured device 150 would not expire as long as the secured device 150 stays in the secured room 102. However, if the secured device 150 exits from the secured room 102 without de-activation at the exit gate 112 by accident, the effective time would expire soon or later.

The storage module 64 is configured store a secured key for accessing to the device secured function 58 and a device identifier used to identify the secured device 150 in the access control system 100.

The lock control module 52 performs entrance and exit handling protocols in relation to the device secured function 58. The lock control module 52 is configured to send the identifier stored in the storage module 64 by the RFID transponder 60 in response to a request transmitted from the control server 120 via the RFID transceiver 126, 128. The lock control module 52 is configured to receive the control signal from the control server 120 by the RFID transponder 60.

The lock control module 52 is configured to unlock or lock the device secured function 58 in response to receiving the control signal transmitted from the control server 120. The control signal may be a device activation signal by which the device secured function 58 is unlocked or a device de-activation signal by which the device secured function 58 is locked.

In a preferably embodiment, the lock control module 52 may perform further a device operation protocol for maintaining activation of the secured device 150. The lock control module 52 may be further configured to refresh the counter 62 in response to receiving the confirmation signal transmitted from the RFID transceiver 124 while the secured device 150 is staying in the secured room 102.

Power for the entrance and exit handlings and device operation protocols may be covered by electromagnetic wave transmitted from the RFID transceiver 126,128 or by any battery device equipped therein.

As shown in FIG. 3, the secured device 150 includes one or more modules 52-64 to provide various features and functions. These modules may be implemented in hardware, software or firmware executable on hardware, or a combination thereof. However, in a preferable embodiment, these modules 52-64 can be implemented in hardware such as a chip or discrete circuit. It should be understood that although not shown, other hardware and/or software components could be used in conjunction with the secured device 150. In a describing embodiment, the secured device 150 may be, but not limited to, implemented as a portable storage device such as a USB flash memories. However, in other embodiments, the secured device 150 may be implemented as any device that includes a protected functionality, which may include smartphones, tablet computers, laptop computers, hand-held computers, stick computers, and so on.

Figure 4:
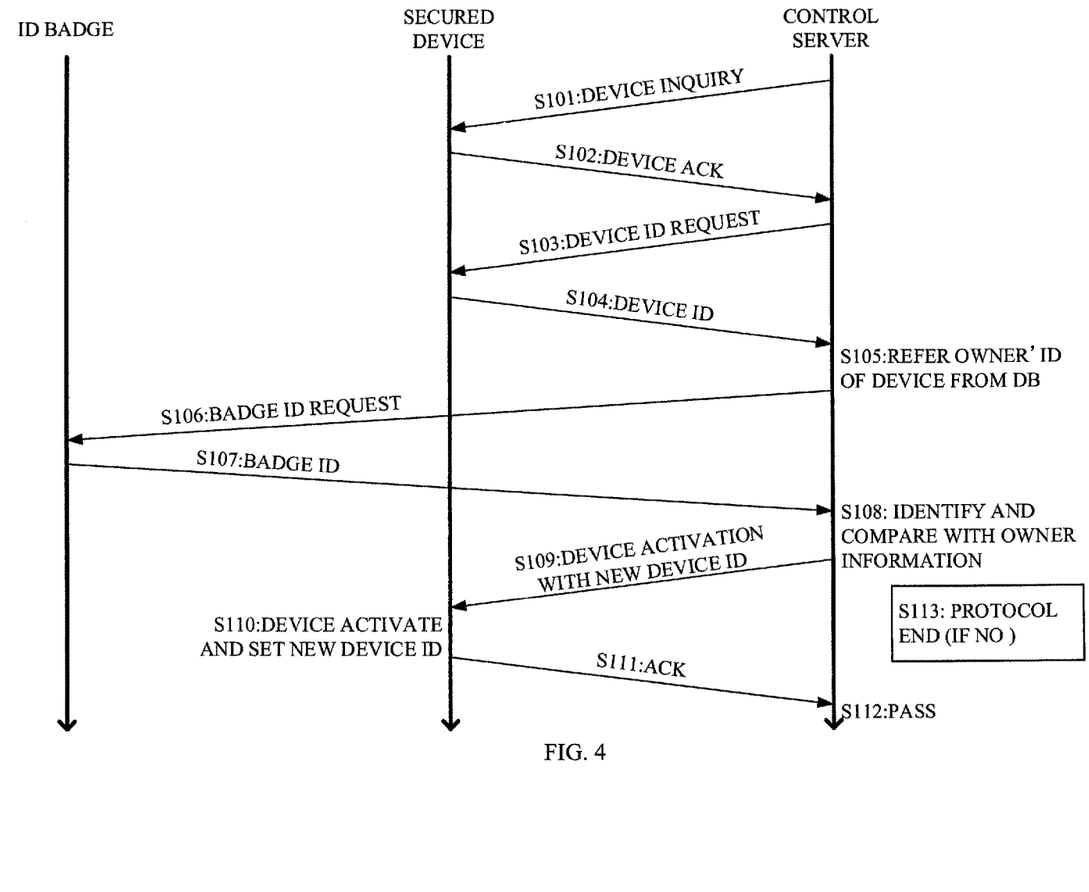
FIG. 4 illustrates an entrance handling protocol between the control server, the secured device and an identification badge in the access control system according to the exemplary embodiment of the present invention.

Referring to FIG. 4, an entrance handling protocol between the control server 120, the secured device 150 and the ID badge 130 in the access control system 100 is shown. As shown in FIG. 4, process for the entrance handling protocol begins at step S101 in which the control server 120 transmits a device inquiry by the RFID transceiver 126 equipped in the entrance gate 110. The device inquiry may be periodically transmitted by the RFID transceiver 126. Alternatively, the device inquiry may be transmitted by the RFID transceiver 126 in response to detecting that someone enters the entrance gate 110 by any known sensor such as a motion detector.

In response to receiving the device inquiry from the control server 120 by the RFID transponder 60, the secured device 150 just passing the entrance gate 110 responds a device acknowledgement (in the drawings "acknowledgement" may be referred as "ack") by the RFID transponder 60 at step S102. If the control server 120 receives the device acknowledgement for the device inquiry, the control server 120 further sends a device ID request to the secured device 150 by the RFID transceiver 126 at step S103.

In response to receiving the device ID request from the control server 120, the secured device 150 responds own device ID stored in the storage module 64 by the RFID transponder 60 at step S104. If the control server 120 receives the device ID as a response for the device ID request, the control server 120 refers owner's ID corresponding to the received device ID from the device and owner DB 122 at step S105. Then, the control server 120 transmits a badge ID request by the RFID transceiver 126 at step S106.

In response to receiving the badge ID request from the control server 120, the ID badge 130 just passing the entrance gate 110 responds the own badge ID at step S107. If the control server 120 receives the badge ID as a response for the badge ID request, the control server 120 identifies a user just passing the entrance gate 110 by using the received badge ID and compares the identified badge ID with the owner information corresponding to the received device ID at step S108. In a preferable embodiment, the control server 120 may authenticate the user by using the badge ID with user authentication information in the device and owner DB 122 or other external user information database.

If the control server 120 determines that the identified badge ID is matched with the owner's ID of the secured device 150 entering with the badge ID in the step S108, then the control server 120 transmits a device activation signal, preferably with a device ID newly generated by the control server 120 at step S109.

In a preferable embodiment, the control server 120 generates a new device ID used to identify the secured device 150 and sends the new device ID to the secured device 150 via the RFID transceiver 126. The device ID may be updated every time when the secured device 150 goes in the secured room 102 and merely the control server 120 can know the latest device ID in this embodiment. Therefore, even though duplication of the secured device 150 is possible, the duplication may become meaningless after the authorized owner enters the secured room 102 appropriately. Also in other preferable embodiment, the device activation signal may be encrypted by appropriate technique on the basis of the device ID in order to prevent the signal from eavesdropping and/or duplicating.

In response to receiving the device activation signal from the control server 120, the secured device 150 activates itself so as to unlock the device secured function 58 by the lock control module 52, and preferably sets the new device ID in the storage module 64 in order to send the new device ID for a next time. Then, the secured device 150 responds an acknowledgement to the control server 120 at Step S111. If the control server 120 receives the acknowledgement for the device activation signal, the control server 120 passes the user by opening the entrance gate 110 at step S112, for instance. In the preferable embodiment, the newly generated device ID may be overridden into the device and owner DB 122.

If the control server 120 determines that the identified badge ID is not matched with the owner's ID in the step S108 (NO), the process proceeds to step S113 and ends the protocol. In this case, the secured device 150 would not be unlocked since unauthorized pair of the secured device 150 and the ID badge 130 enters the entrance gate 110 together.

Figure 5:
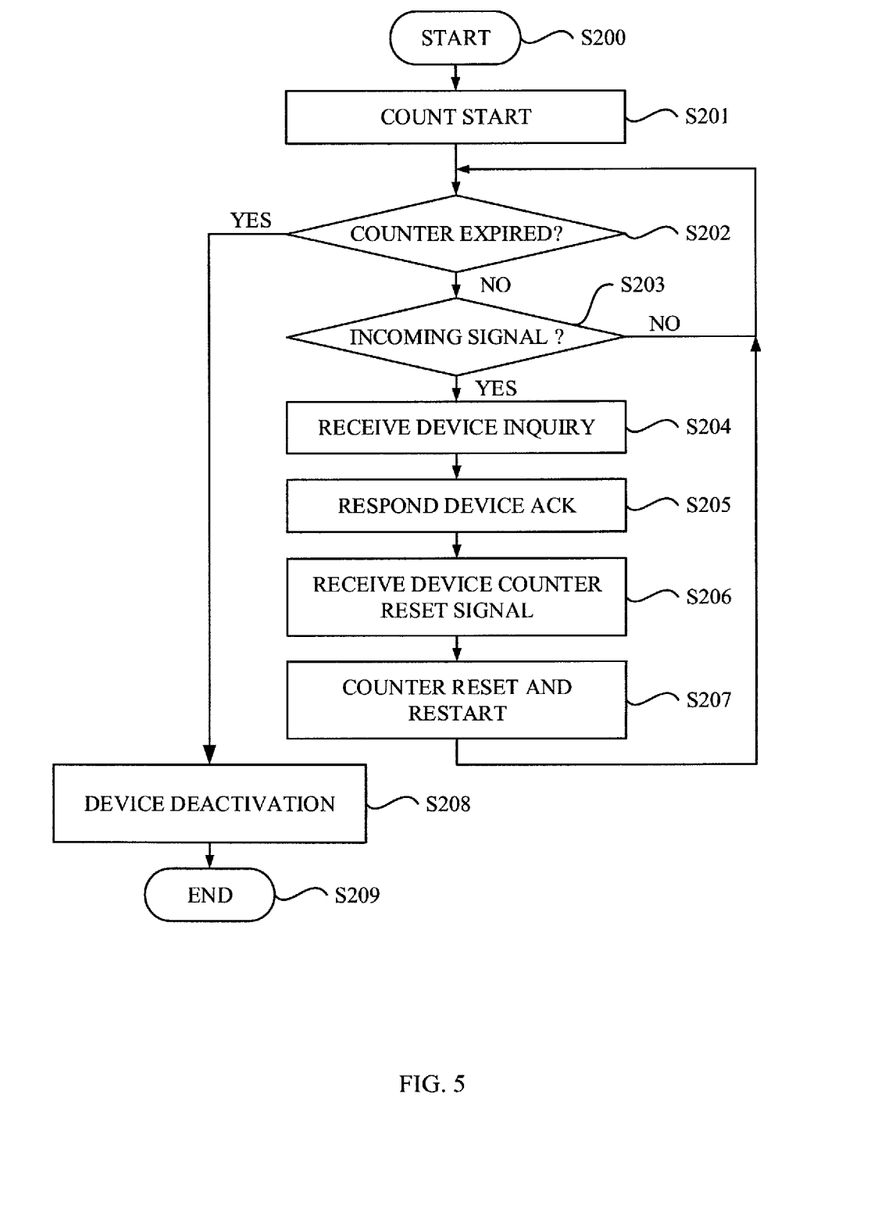
FIG. 5 is a flowchart depicting a device operation protocol executed by the secured device in the access control system according to the exemplary embodiment of the present invention.

Referring to FIG. 5, a device operation protocol executed by the secured device 150 in the access control system 100 is shown. As shown in FIG. 5, process for the operation protocol begins at step S200 in response to the secured device 150 being powered on for instance. At step S201 the secured device 150 initiates the counter 62 for counting the effective time. At step S202, the secured device 150 determines whether the counter 62 expires or not.

If the secured device 150 determines that the counter 62 does not expire in step S202 (NO), the process branches to step S203. At step 203, the secured device 150 further determines whether an incoming signal is presented or not. If the secured device 150 determines that the incoming signal is not presented at step 203 (NO), then the process loops back to step S202 in order to wait for the incoming signal.

If the secured device 150 determines that the incoming signal is presented in step S203 (YES), the process branches to step S204. In a particular embodiment, the device inquiry may be periodically transmitted by the RFID transceiver 124 for the secured device staying in the secured room 102. At step S204, the secured device 150 receives the device inquiry transmitted from the RFID transceiver 124. At step S205, the secured device 150 responds a device acknowledgement for the device inquiry.

The RFID transceiver 124 may transmit a device counter reset signal as confirmation signal in the describing embodiment, if the control server 120 confirms that the secured device 150 is staying in the secured room 102 using the device inquiry. At step S206, the secured device 150 receives the device counter reset signal from the RFID transceiver 124. At step S207, the secured device 150 resets and restarts the counter 62, and the process loops back to step S202 in order to wait for expiration.

If the secured device 150 determines that the counter 62 expires in step S202 (YES), the process proceeds to step S208. At step 208, the secured device 150 deactivates the device secured function 58 by the lock control module 52, and the process ends at step S209.

According to the device operation protocol shown in FIG. 5, the counter 62 counts down the effective time while the secured device 150 is operating. The control server 120 causes the counter reset with appropriate intervals. A situation where the counter reset does not take place means that the secured device 150 is not staying in the secured room 102. Thus, the effective time would expire soon or later and the device secured function 58 of the secured device 150 would become inaccessible.

On the other hand, by repeating the reset of the counter 62, it is confirmed that the secured device 150 is staying in the secured room 102. The effective time would not expire as long as the secured device 150 is staying in the secured room 102.

Figure 6:
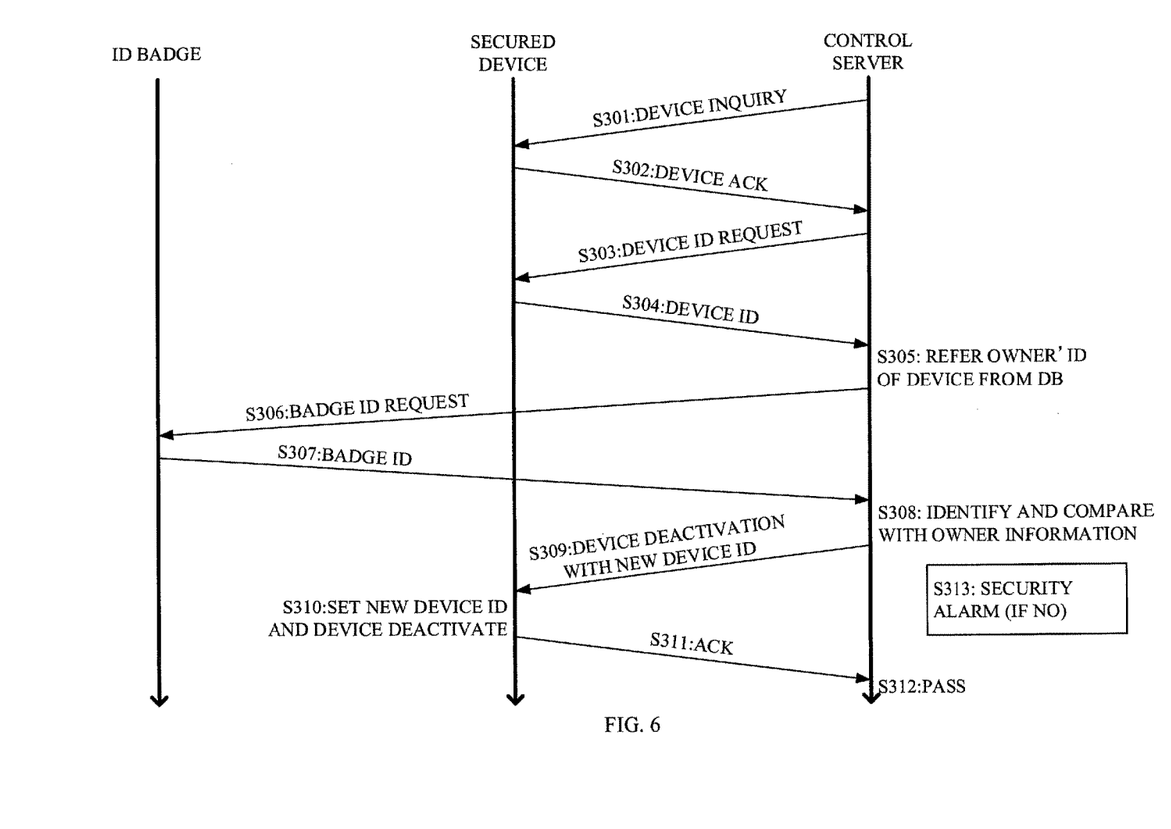
FIG. 6 illustrates an exit handling protocol between the control server, the secured device and the identification badge in the access control system according to the exemplary embodiment of the present invention.

Referring to FIG. 6, an exit handling protocol between the control server 120, the secured device 150 and the ID badge 130 in the access control system 100 is shown. As shown in FIG. 6, process for the exit handling protocol begins at step S301 in which the control server 120 transmits a device inquiry by the RFID transceiver 128 equipped in the exit gate 112. The device inquiry may also be transmitted periodically or in response to detecting that someone enters the exit gate 112 by any known sensor.

In response to receiving the device inquiry from the control server 120, the secured device 150 just passing the exit gate 112 responds a device acknowledgement by the RFID transponder 60 at step S302. If the control server 120 receives the device acknowledgement for the device inquiry, the control server 120 further sends a device ID request to the secured device 150 by the RFID transceiver 128 at step S303.

In response to receiving the device ID request from the control server 120, the secured device 150 responds own device ID stored in the storage module 64 by the RFID transponder 60 at step S304. If the control server 120 receives the device ID, the control server 120 refers owner's ID corresponding to the received device ID from the device and owner DB 122 at step S305. Then, the control server 120 transmits a badge ID request by the RFID transceiver 128 at step S306.

In response to receiving the badge ID request from the control server 120, the ID badge 130 just passing the exit gate 112 responds own badge ID at step S307. If the control server 120 receives the badge ID, the control server 120 identifies a user just passing the exit gate 112 with the ID badge 130 and the secured device 150 and compares the identified badge ID with the owner information corresponding to the device ID at step S308.

In a preferable embodiment, the control server 120 may also authenticate the user by using the badge ID with the device and owner DB 122 or other external user authentication information. If the identified badge ID is matched with the owner's ID of the secured device 150 in step S308, then the control server 120 transmits a device de-activation signal, preferably with a device ID newly generated by the control server 120 at step S309. In a preferable embodiment, the control server 120 generates a new device ID used to identify the secured device 150 and sends the new device ID to the secured device 150 via the RFID transceiver 128 as similar as the entrance handling protocol.

In response to receiving the de-activation signal from the control server 120, the secured device 150 de-activates itself so as to lock the device secured function 58 by the lock control module 52, and preferably sets the new device ID in the storage module 64 in order to send the new device ID for a next time. Then, the secured device 150 responds an acknowledgement to the control server 120 at step S311. Since the device ID may be updated every time when the secured device 150 goes out of the secured room 102 and merely the control server 120 can know the latest device ID in this embodiment, the duplication of the secured device 150 may become meaningless after the authorized user exits the secured room 102 appropriately.

If the control server 120 receives the acknowledgement for the de-activation signal, the control server passes the user by opening the exit gate 112 at step S312, for instance. In the preferable embodiment, the newly generated device ID may be overridden into the device and owner DB 122.

If the control server 120 determines the identified badge ID is not matched with the owner's ID in step S308 (NO), the process proceeds to step S313 to put a security alarm of the alarm device 129 into action. In this case, the secured device 150 would be locked and the alarm notifies that unauthorized pair of the secured device 150 and the ID badge 130 exits the exit gate 112 together.

In accordance with the entrance handling, exit handling and device operation protocols according to the exemplary embodiment of the present invention, following cases can be supposed.

When any person other than the owner user enters the secured room 102 with the secured device 150, the secured device 150 would not be activated since inconsistency between the badge ID and the device ID is detected.

When any person other than the owner user leaves the secured room 102 with the secured device 150, the secured device 150 would be de-activated and the security alarm may be alerted since inconsistency between the badge ID and the device ID is detected or exit of solely the secured device 150 from the secured room 102 is detected.

When the owner user leaves the secured room 102 without carrying the secured device 150, alarm may be alerted and the control server 120 may terminate the device inquiry (confirmation signal) by the RFID transceiver 124 since exit of solely the owner user from the secured room 102 is detected and the corresponding secured device 150 is left behind the secured room 102. The secured device 150 would cause the counter 62 to expire and be automatically de-activated.

When the secured device 150 enters the secured room 102 without passing through the entrance gate 110, access to the device secured function 58 would be denied since the secured device 150 is not activated at the entrance room 104 in proper manner.

When the secured device 150 exits from the secured room 102 without passing through the exit gate 112, the secured device 150 may keep activation for a short amount of time, however, the counter 62 would expire soon or later so as to make the secured device 150 inactive in response to being powered on since the counter 62 is not subjected to the polling of the confirmation signal.

When power supply for the access control system 100 is terminated by accident, the secured device 150 would cause the counter 62 to expire and be automatically de-activated. Thus, even though a host computer to which the secured device 150 is connected has a battery, access to the device secured function 58 would be prevented.

In the above describing embodiment, the device and owner DB 122 is configured to store the relationship between the secured device 150 and the owner user paired with the secured device 150, and the device secured function 58 is unlocked merely if the authorized pair is entered the secured room 102 together. However, this is only an example of applicable rules for activation of the secured device 150.

In one or more embodiments according to the present invention, there are several applicable rules for activation/de-activation of the secured device 150. Referring to FIG. 7, four applicable rules for activation/de-activation of the secured device 150 are shown.

Figure 7A:
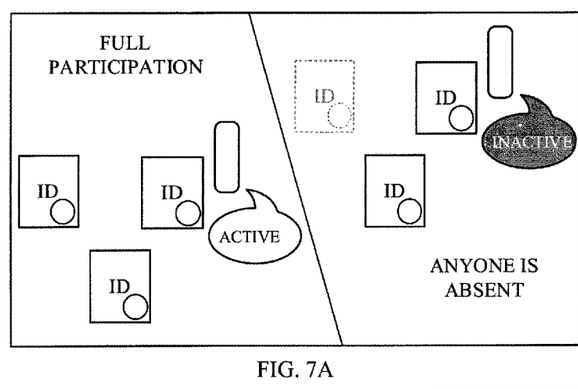
FIG. 7A illustrates a rule for activation/de-activation of a secured device according to one or more embodiments of the present invention.

In one embodiment, the registered user in the device and owner DB 122 may include a plurality of necessary owners, and access to the device secured function 58 is denied if any one of the necessary owners is out of the secured room 102. FIG. 7A describes a condition that includes a logical conjunction (i.e. AND operation) of the owners. In FIG. 7, a badge marked by a gray circle represents an owner's ID badge. A badge with a dash line represents the ID badge that is absent. As shown in FIG. 7A, to activate the secured device 150 all of the necessary owners are requested to exist in the secured room 102. If anyone is absent, the secured device 150 becomes inactive. In this embodiment, it is preferable that the secured device 150 can be activated in the secured room 102 without passing through the entrance gate 110.

Figure 7B:
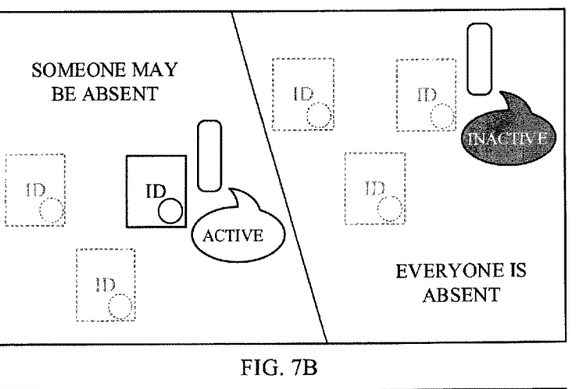
FIG. 7B illustrates a rule for activation/de-activation of a secured device according to one or more embodiments of the present invention.

In other embodiment, the registered user may include a plurality of owners, and access to the device secured function 58 is permitted if any one of the owners is staying in the secured room 102. FIG. 7B shows a condition that includes a logical disjunction of the owners (i.e. OR operation). As shown in FIG. 7B, the secured device 150 is activated in the presence of any one of the owners registered for the secured device 150. The secured device 150 becomes inactive merely if everyone is absent.

In further other embodiments, the registered user in the device and owner DB 122 may include one or more whitelisted or black-listed users, in order to prevent shoulder surfing.

Figure 7C:
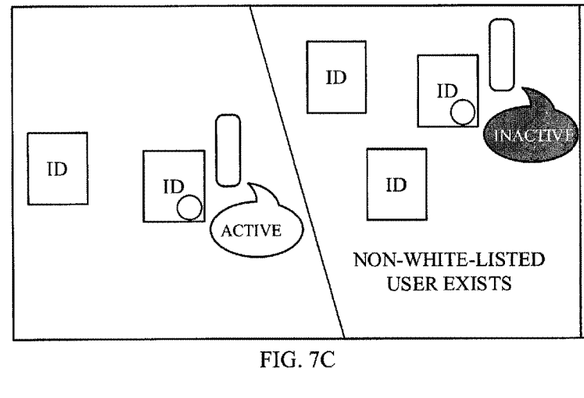
FIG. 7C illustrates a rule for activation/de-activation of a secured device according to one or more embodiments of the present invention.

In one embodiment, the registered user may include one or more white-listed users, and access to the device secured function 58 is denied if any user other than the one or more white-listed users is staying in the secured room 102. FIG. 7C describes a condition that includes a whitelist of users. A badge filled by gray represents a non-white-listed user' badge. As shown in FIG. 7C, the secured device 150 is de-activated if a person who is not listed in the whitelist exists in the secured room 102 even though the owner exists in the secured room 102.

Figure 7D:
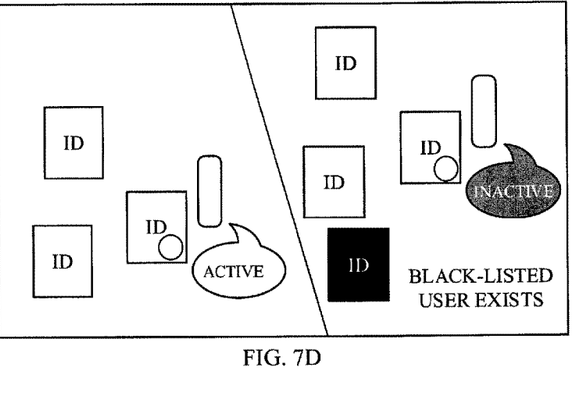
FIG. 7D illustrates a rule for activation/de-activation of a secured device according to one or more embodiments of the present invention.

In other embodiment, the registered user may include one or more black-listed users, and access to the device secured function 58 is denied if any one of the one or more black-listed users is staying in the secured room 102. FIG. 7D describes a condition that includes a blacklist of users. A badge filled by black represents a black-listed user' badge. As shown in FIG. 7D, the secured device 150 is de-activated if a person who is listed in the blacklist exists in the secured room 102 even though the owner exists in the secured room 102.

The access control system, method for controlling access to the device secured function of the secured device and the secured device shown in FIGS. 1-6 have following advantages:

The secured device 150 is automatically activated or de-activated in response to the secured device 150 and its owner passing the gate 110, 112. Any additional action to activate the secured device 150 is not required. The secured device 150 would be activated merely if the authorized pair of the secured device 150 and the owner passes through the gate 110, 112. The secured device 150 would not be activated when another person carrying the secured device 150 enters the secured room 102.

The secured device 150 does not become active unless it resides in the secured room 102 with the owner. Thus, any third party could not use the secured device 150 outside of the secured room 102. In the preferable embodiment, a new device ID is distributed in response to enter or exit from the secured room 102. Accordingly, the secured device 150 that is exited from the secured room 102 without passing through the exit gate 112 would not be activated for next time or later. For another advantage, the history of the entrance and exit of the secured device 150 and the owner user can be recorded.

According to one or more embodiment of the present invention, there is provided a way for direct activating or de-activating the device secured function 58 of the secured device 150, without interposing any computer, in response to only the authorized owner passing through the predetermined area with the secured device 150. In the access control system 100 and method shown in FIGS. 1-7, inadvertent disclosures, exposures or leakage of the sensitive information to unauthorized parties or entities can be preferably prevented.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A control system for controlling access to a protected function of an information device, comprising:
    a communication device configured to communicate with the information device entering an area, the information device having a current information device identifier;

a database configured to store a relationship between the information device and a registered user;

a control computer communicably connected to the communication device, the control computer being configured to:

send to the information device, each time the information device exits the area, a next information device identifier that is different than the current information device identifier, the next information device identifier being for the information device to store, each time the information device exits the area, as an updated information device identifier in place of the current information device identifier;

identify the information device each time the information device enters the area based on receiving from the information device the updated information device identifier that was sent by the control computer to the information device a most recent time when the information device exited the area;

identify a user entering the area with the information device;

determine whether or not to permit access to the protected function based on the identified user and the registered user for the information device; and control the information device via the communication device so as to unlock or lock the protected function based on a result of determination whether or not to permit access.

2. The control system of claim 1, wherein the user entering a predetermined section by passing through the area is subjected to identification and the protected function of the information device entering the predetermined section with the user is controlled to be unlocked in response to determining that the access is to be permitted.

3. The control system of claim 1, wherein a user exiting from a predetermined section by passing through the area is subjected to identification and the protected function of the information device exiting from the predetermined section with the user is controlled to be locked.

4. The control system of claim 1, wherein the control system further comprises:

a transmit device in communication with the control computer, the transmit device being configured to transmit a confirmation signal so as to extend an effective time during which access to the protected function is permitted while the information device is in a predetermined section where the information device enters by passing through the area.

5. The control system of claim 4, wherein the registered user includes an owner, the transmit device being further configured to:

terminate the confirmation signal to extend the effective time for the information device related to the owner in response to detecting exit of the owner from the predetermined section.

6. The control system of claim 1, wherein the registered user includes a plurality of necessary owners, and access to the protected function is denied if any one of the necessary owners is out of a predetermined section.

7. The control system of claim 1, wherein the registered user includes a plurality of owners, and access to the protected function is permitted if any one of the owners is staying in a predetermined section.

8. The control system of claim 1, wherein the registered user includes one or more white-listed users, and access to the protected function is denied if any user other than the one or more white-listed users is staying in a predetermined section.

9. The control system of claim 1, wherein the registered user includes one or more black-listed users, and access to the protected function is denied if any one of the one or more black-listed users is staying in a predetermined section.

10. The control system of claim 1, wherein the control system further comprises:

an alarm device in communication with the control computer, the alarm device being configured to alarm if the information device exits from a predetermined section by passing through the area even though owner is staying in the predetermined section and/or to alarm if owner exit from the predetermined section even though the information device related to the owner is staying in the predetermined section.

11. The control system of claim 1, wherein the protected function is a secured storage region on the information device, identification of the user is performed by using an identification badge assigned to the user and the communication device is a wireless communication device.

12. The control system of claim 1, wherein the communication device includes a plurality of communication devices, each being provided in each section among a plurality of sections, the database is further configured to store relationship between the information device and an allowable section, and access to the protected function is denied if the information device is not staying in a corresponding allowable section.

13. A method for controlling, by a control computer, access to a protected function of an information device, where the information device has a current information device identifier, the method comprising:

sending to the information device, each time the information device exits an area, a next information device identifier that is different than the current information device identifier, the next information device identifier being for the information device to store, each time the information device exits the area, as an updated information device identifier in place of the current information device identifier;

identify the information device each time the information device enters the area based on receiving from the information device the updated information device identifier that was sent by the control computer to the information device a most recent time when the information device exited the area;

identifying a user entering an area with the information device;

determining whether or not to permit access to the protected function based on the identified user and a registered user in relation to the identifier; and transmitting a control signal to the information device by the communication device so as to unlock or lock the protected function based on a result of determination whether or not to permit access.

14. An information device having a current information device identifier, comprising:

a communication device configured to communicate with a control computer in entering an area;

a protected module, access to the protected module being controlled by the control computer;

a lock control module configured to block access to the protected module if the protected module is locked; and an interface module for accessing the protected module via the lock control module;

wherein the lock control module is further configured to:
receive, from the control computer via the communication device each time the information device exits the area, a next information device identifier that is different than the current information device identifier, the next information device identifier being for the information device to store, each time the information device exits the area, as an updated information device identifier in place of the current information device identifier;
send, to the control computer via the communication device for the control computer to use to identify the information device each time the information device enters the area, the updated information device identifier that was sent by the control computer to the information device a most recent time when the information device exited the area;

receive a control signal from the control computer by the communication device; and
unlock or lock the protected module in response to receiving the control signal.

15. The information device of claim 14, wherein the information device further comprises:
a counter module configured to count down an effective time during which access to the protected module is permitted in response to being powered on;
wherein the lock control module is further configured to refresh the counter module in response to receiving a confirmation signal, the confirmation signal being transmitted from a transmit device communicably connected to the control computer while the information device is in a predetermined section where the information device enters by passing through the area.

* * * * *